INVENTOR:
HARRY A. CHENEY
BY: *Martin S. Baer*
HIS ATTORNEY

INVENTOR:
HARRY A. CHENEY

United States Patent Office

3,146,223
Patented Aug. 25, 1964

3,146,223
POLYMERIZATION IN THE PRESENCE OF CONTROLLED AMOUNTS OF HYDROGEN
Harry A. Cheney, Berkeley, Calif., assignor to Shell Oil Company, a corporation of Delaware
Filed Aug. 21, 1959, Ser. No. 835,296
4 Claims. (Cl. 260—93.7)

This invention relates to a method and apparatus for the determination of low concentrations of hydrogen in olefinic hydrogen gases. It also relates specifically to a method for the polymerization of olefins in which said apparatus and method are employed to control the molecular weight of the polyolefin product by maintaining a desired partial pressure of hydrogen in contact with the reaction mass.

It is now known that alpha-monoolefins can be polymerized at low temperatures and low pressures to produce polymers which are linear in structure. The methods for carrying out such polymerizations are generically referred to as "low pressure" methods and the polymers thus produced are termed "crystalline," "low pressure," "linear" or "isotactic" polymers. The low pressure polymers are produced by employing any of a variety of catalysts which are called "low pressure" or "Ziegler type" catalysts.

A particularly useful linear polymer of this type is polypropylene. In the production of polypropylene by means of low pressure catalysts it is generally found that the molecular weight of the resulting solid polymer is higher than is desirable for most advantageous commercial utilization of the polymer, e.g., for its use in moldings and castings. It has been found that the presence of hydrogen in the reaction mixture can drastically reduce the molecular weight of the resulting polymer. This invention is particularly concerned with continuous methods of operation. It has now been found that it is important, if consistent results are to be obtained in continuous operation, to maintain a carefully controlled partial pressure of hydrogen in the vapor which is in contact with the liquid reaction mass. Under these circumstances, careful control of hydrogen addition is required because even small changes in the partial pressure of hydrogen in the vapor phase result in substantial changes in the reaction mixture and cause large changes in the molecular weight of the polymer.

In carrying out the low pressure polymerization of propylene with addition of hydrogen for control of the molecular weight of the polymer it was found that available methods for hydrogen determination were not sufficiently accurate for precise control and the present method was devised to permit improved control of the molecular weight of polypropylene. The method is also applicable when hydrogen is used in low concentrations in the polymerization of other monoolefins or of diolefins, or, indeed, wherever the analysis for small amounts of hydrogen in an olefinic mixture is required.

It is an object of this invention to provide a method for the determination of hydrogen in low concentrations in olefinic hydrocarbon mixtures. It is a further object to provide an apparatus suitable for the determination of hydrogen in low concentration in olefin-containing hydrocarbon mixtures. Another object is to provide an improved process for the production of polypropylene. A still further object is to provide an improved method for the precise determination of hydrogen in the production of polyolefins. It is a specific object to provide a method for maintaining a controlled vapor pressure of hydrogen in a continuous propylene polymerization process. It is also an object to provide a method for the production of solid polypropylene of controlled, relatively low molecular weight.

A number of methods are known which are suitable for the determination of hydrogen in gas mixtures. A method which appeared promising for the control of hydrogen in propylene polymerization and similar processes is the thermal conductivity method of gas analysis which is described, for example, by C. C. Minter in "Journal of Chemical Education," 23, 237–239 (1946). The thermal conductivity method and apparatus is also described in numerous other publications, including U.S. Patents 1,504,707, 2,422,129, 2,472,645, and others. Thermal conductivity gas analysis instruments are commercially available. A suitable instrument is illustrated, for example, in FIG. 3 of the paper by Minter. A similar instrument is described in detail in Bulletin FIL 12–57 of Gow-Mac Instrument Company, Madison, New Jersey. The latter instrument is typical of those which are suitable, when modified, for use in the process of this invention.

The thermal conductivity of a gas is a measure of the quantity of heat conducted in unit time between two unit surfaces in the gas when they are a unit distance apart and the temperature differential is a unit of temperature. However, measurement or knowledge of the absolute thermal conductivity of a gas are not required in the thermal conductivity method of gas analysis.

The thermal conductivity cell itself is a small cell containing a wire heated by an electric current. The loss of heat from the wire to the cell wall is a function of the thermal conductivity of the gas contained in the cell; hence, changes in the thermal conductivity of the gas in the cell cause corresponding changes in the temperature of the wire and consequently in the electrical resistance of the wire. Various types of cells are known and may be employed. These include the diffusion type, illustrated in the drawing, in which gas diffuses from a conduit into the cell; another type permits a continuous flow of gas through the cell.

In the standard method of analysis balanced cells are employed in which one cell contains a reference gas and the other contains the sample gas. The conducting wires of the cells form different arms of a bridge circuit, e.g., a Wheatstone bridge. If the bridge is balanced when both cells contain the reference gas then the unbalance of the bridge is a function of the difference in composition between the sample gas and the reference gas, provided the gases have different thermal conductivities. In ordinary practice the instrument is calibrated in arbitrary units by placing different samples of gas of known concentrations of the desired component to be measured into the sample cell and a known reference gas into the reference cell and observing the resulting reading of an ammeter or potentiometer. The reading of the unbalance of the bridge circuit may be performed by a measuring or a recording instrument and may be employed in known manner for actuating control devices such as motorized valves.

Binary gas mixtures can be directly analyzed by thermal conductivity apparatus provided the differences in thermal conductivity between the components are substantial. Since hydrogen has a very much greater thermal conductivity than any hydrocarbon gases, mixtures of hydrogen with mixed hydrocarbon gases are often treated as binary mixtures. For example, Webb et al., in "Industrial and Engineering Chemistry—Analytical Edition," 16, 719 (1944), describe a method for hydrogen determination in the off-gas from a hydrogenation process in which the instrument was used as for a binary mixture and the gas in the standard reference cell was pure hydrogen.

In an attempt to apply thermal conductivity analysis to the control of hydrogen in hydrocarbon mixtures in which hydrogen is present in low concentrations, e.g., not exceeding about 10%, and in which there is some variation in the other components, it was found that accurate results could not be obtained when the mixture was treated as a binary mixture with the preponderant component, namely, propylene, in the reference cell.

It has now been found that excellent results in the determination of hydrogen in such mixtures are obtained by passing the mixture to the sample cell of a thermal conductivity apparatus, thence passing the mixture into contact with a highly active hydrogenation catalyst, suitably consisting of a small amount of palladium supported on gamma alumina, whereby the hydrogen reacts completely with olefin contained in the mixture, and passing the effluent from the hydrogenation contact to the reference cell of the thermal conductivity apparatus. It has been found that when the concentration of hydrogen in the mixture does not exceed about 10% and the concentration of olefin in the mixture is at least in molecular excess, relative to the hydrogen present, then complete removal of hydrogen from the mixture by reaction with olefin can be obtained and the conversion of olefin to saturated hydrocarbon is not sufficient to change the thermal conductivity of the mixture significantly. This method of analysis is particularly suitable for continuous analysis in a process such as the present one in which the gas composition is subject to frequent variation.

The active hydrogenation catalyst for use in this invention is preferably selected from the group consisting of platinum group metals on a suitable supporting medium. Commercially available catalytic metals of this group include palladium, platinum, rhodium and ruthenium and available supports include alumina and activated carbon, the former in pelleted or granular form and the latter in granular form. The most preferred catalyst contains about 0.5% by weight palladium on $\frac{1}{16}$ to $\frac{1}{8}$ inch pellets or on 4 to 8 mesh granules of gamma alumina. Catalysts having from 0.2% to 0.5% palladium on alumina or up to 1% on carbon or having from 0.3% to 0.5% platinum on alumina or up to 1% on carbon may be suitably employed. These catalysts are selected to be sufficiently active so that the reaction between hydrogen and olefin in the gas mixture is substantially 100% complete when gas is passed through the catalyst bed at a space velocity from 2 to 6 v./v./min. at atmospheric temperature, i.e., between 20° and 30° C. These conditions are preferably employed, but higher or lower temperatures and rates may be employed if desired. The hydrogenation reaction is exothermic and heat of reaction may increase the temperature of the vessel by as much as 50° C. or more during use.

The hydrogenation contacting chamber is generally a simple small unheated metal vessel, e.g., of about 40 cc. capacity, containing a portion of catalyst held in place, e.g., by screens at each end of the vessel. The vessel may be horizontally or vertically positioned.

According to this invention, therefore, the hydrogen determination apparatus comprises a thermal conductivity determination cell, a conduit adapted to pass a gas sample continuously to said cell, electrical means for measuring an electrical effect varying with the thermal conductivity of the gas in said cell, a conduit connecting said cell with an unheated contacting chamber containing a highly active hydrogenation catalyst, a second conductivity cell, a conduit connecting said chamber with said second cell, adapted to pass gas thereto continuously, electrical means for measuring an electrical effect varying with the thermal conductivity of the gas in said second cell and means arranged to compare the magnitude of said electrical effects.

This invention also comprises a method of determining accurately the hydrogen content of a mixture containing a small concentration of hydrogen and at least a molecular equivalent concentration of unsaturated hydrocarbons which comprises passing a sample of the mixture continuously into contact with a highly active hydrogenation catalyst whereby the hydrogen reacts completely with the olefin and measuring the difference in thermal conductivity of the gas mixture before entry into and after discharge from the hydrogenation step.

This invention further comprises a continuous method of producing a polyolefin of closely controlled molecular weight which comprises contacting an olefin-containing gas in liquid phase with a low pressure polymerization catalyst in a zone containing a liquid and a vapor phase, adding to the reaction mass a controlled amount of hydrogen gas, continuously withdrawing from the reaction mass a stream containing hydrogen and recycling at least the major part of the gaseous portion thereof to the reaction mass while continuously sampling said gaseous portion, determining the hydrogen content thereof in the manner just described, and controlling the rate of addition of fresh hydrogen so that the partial pressure of hydrogen in the vapor phase in said reaction zone is maintained at a predetermined value, whereby the molecular weight of the polyolefin product is maintained in a predetermined desired range.

The method of producing polymers by contacting olefins with Ziegler type catalysts is well known to the art and need not be here described in detail. Reference may be made, for example, to Belgium Patent No. 549,910 to Hercules Powder Company, which also describes the addition of hydrogen in polymerization with low pressure polymerization catalysts. The patent illustrates the use of hydrogen with olefins including ethylene, propylene, styrene, butene-1, octene-1, the copolymerization of propylene with isoprene and others. The polymerization reaction is suitably carried out by mixing a transition metal compound and an organometallic compound, usually in an inert organic diluent, and then adding the olefin and hydrogen to the reaction mixture. The transition metal is suitably one selected from the left hand subgroup of subgroups "a" of Groups IV, V and VI of the Mendeleev Periodic Table as illustrated on page 28 of Ephraim, "Inorganic Chemistry," Sixth English Edition. In other arrangements of the Periodic Table these are sometimes designated subgroups B of the same groups. Suitable transition metals include, for example, titanium, zirconium, hafnium, thorium, vanadium, columbium, tantalum, chromium, molybdenum, tungsten, uranium and the like. Manganese and Group VIII metals such as iron, cobalt and nickel may also sometimes be employed. The compounds may be inorganic salts such as halides, oxyhalides, etc., or organic salts or complexes. Of particular value are the metal halides such as titanium tetrachloride and titanium trichloride. The organometallic compound which is reacted with one of the transition metal compounds or mixtures thereof may be any organo compound of an alkali metal, alkine earth metal, zinc, Group III metal or rare earth metal. Particularly preferred are aluminum trialkyls, magnesium alkyls, zinc alkyls, Grignard compounds, aluminum sesquihalides and compounds of the formula $R_1R_2AlX$ and $R_1AlX_2$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid.

In the interest of simplicity and clarity, the description of this invention for the most part is confined to a discussion of propylene polymerization. It will be understood that the invention is more widely applicable, as has been explained.

Suitable polymerization conditions include temperatures from about −50° F. to about 150° C. and preferably from about −20° C. to about 100° C. Atmospheric pressure and slight superatmospheric pressures up to about 40 pounds per square inch (p.s.i.) are preferably used but pressures from a partial vacuum to about 1000 p.s.i. or higher may be employed.

Propylene and the higher olefins are quite sensitive to small concentrations of hydrogen. The partial pressure of hydrogen employed in the polymerization of propylene and higher olefins will generally be in the range from about 0.002 atmosphere up to 0.4 atmosphere and preferably in the lower part of said range.

In the above-mentioned Hercules Belgium patent, thirty-one examples are illustrative of batch operations in which a fixed amount of olefin and hydrogen gas were charged to a reactor and permitted to react in the presence of various catalysts. In one run a continuous reaction was carried out by continuously charging both an olefin and hydrogen to the reactor in a fixed ratio with no provision for gas recycle. This was an ethylene polymerization run. Ethylene polymerization is known to be relatively insensitive to variations in the hydrogen concentration.

The present invention is not concerned with either batch operations or reactions in which hydrogen and olefin are continuously charged at a fixed ratio and then discharged and discarded from the system. Such methods are suitable for laboratory studies but are generally not suitable for a large scale commercial operation. Rather, the present invention is concerned with a method of controlling hydrogen addition in olefin polymerization a large scale operation in which gas is continuously recycled back to the reactor and it is important to know the hydrogen content of the gas precisely so that make-up hydrogen may be added to maintain a predetermined precise concentration of hydrogen in the reactor. The composition of gas recycled to the reactor in propylene polymerization before addition of make-up hydrogen, typically is in the following range:

|  | Percent by volume |
|---|---|
| Hydrogen | 0–2 |
| Ethane | 0–1 |
| Propane | 0–70 |
| Propylene | 30–80 |
| n-Butane | 0–1 |
| Isopentane | 0–20 |

The invention will be further described by reference to the drawing wherein

Figure 1:
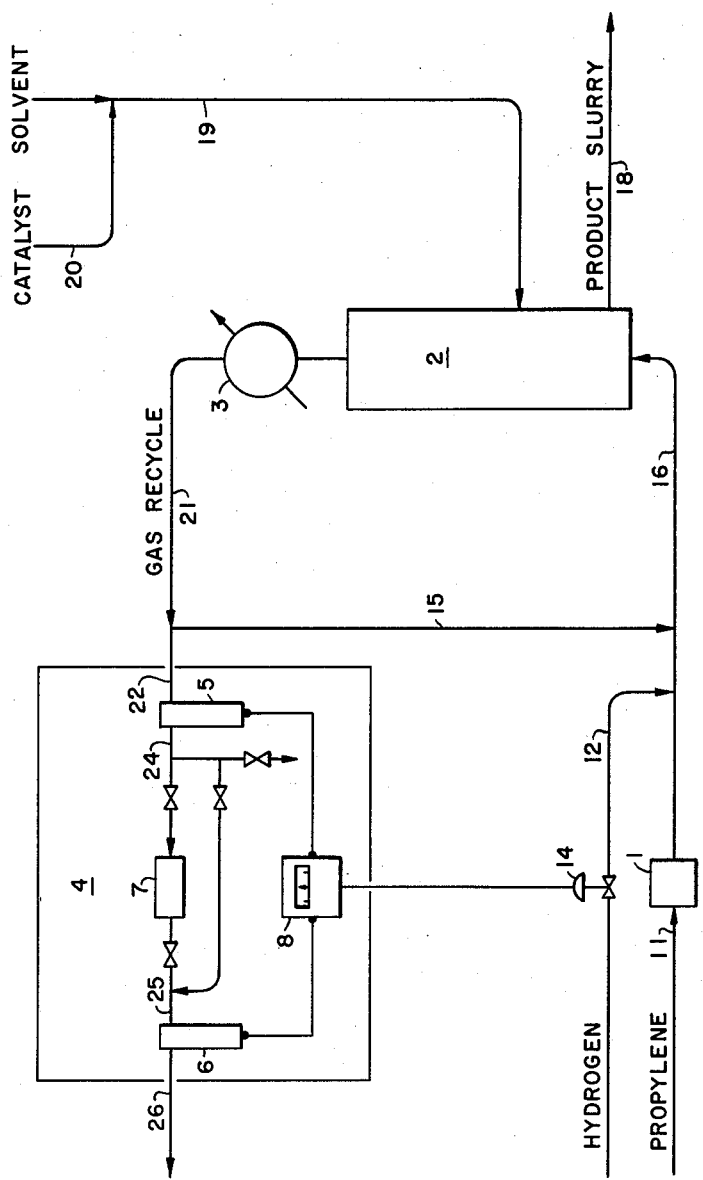
FIG. 1 is a schematic diagram of apparatus suitable for the practice of the invention.

FIG. 1 illustrates the application of the analytical method of this invention to the production of polypropylene by the low pressure polymerization of propylene. Only the essential equipment and connections are shown. Much auxiliary equipment such as pumps, valves and the like, whose placement will be obvious to persons skilled in this art, is omitted to simplify the explanation. The equipment consists essentially of a propylene purification zone 1, a polymerization reactor 2, a reflux condenser 3, and a hydrogen analyzing apparatus 4 which contains diffuson type thermal conductivity sample cell 5, and reference cell 6, hydrogenation contacting chamber 7, and recorder controller 8.

In the operation of the process, propylene is introduced into the system through line 11 and is suitably purified by various known means in zone 1 to provide a feed which is substantially free of harmful impurities. The propylene is then passed from zone 1 to reactor 2 via line 16. Into line 16 there are further added hydrogen from line 12 controlled by valve 14 and recycle gas, from a source described below, through line 15. In addition to the mixture from line 16 there is also added to the reactor through line 19 a suitable hydrocarbon solvent, e.g., isopentane, to which has also been added a slurry of low pressure catalyst. The catalyst slurry may, for example, consist of aluminum diethylchloride and titanium trichloride in a mole ratio (Al:Ti) exceeding 1 to 1. The reactor contents are agitated either by mechanical means or by gas agitation to maintain uniform conditions suitable for propylene polymerization. The polymerization reaction is exothermic. Heat may be removed by internal heat exchange, but is preferably removed at least in part by evaporation of one or more components of the total reactor contents. Vapor effluent passes through reflux condenser 3 from which the condensible components are directly returned to the reactor and the uncondensed gas is recycled at least in substantial part to the reactor via lines 21, 15 and 16.

A portion of the gas from line 21 is continually sampled via line 22. In the preferred operation of analyzer 4 the gas passes via line 22 to sample cell 5, thence through line 24 to hydrogenation chamber 7 and thence through line 25 to reference cell 6; it is finally discarded via line 26. Hydrogenation chamber 7 contains a very active hydrogenation catalyst, e.g., about ½% palladium on gamma alumina, which causes the hydrogen to react with propylene at substantially atmospheric temperature. The readings from the sample cell and reference cell are compared by recorder-controller 8. If desired, this instrument may be employed to control the flow of hydrogen in line 12 by way of valve 14 in direct response to the hydrogen content of the recycle gas. Thus, if the hydrogen content increases above a predetermined desired value the flow in line 12 will be accordingly reduced and vice versa. Alternatively, hydrogen valve 14 may be manually controlled in response to the reading of recorder 8.

The connection of the sample cells includes an optional bypass around hydrogenation chamber 7. This permits passage of the same gas to both the sample and reference cells to establish a zero point. The required valving and piping is shown on the drawing. Its use will be immediately apparent without further discussion.

Figure 2:
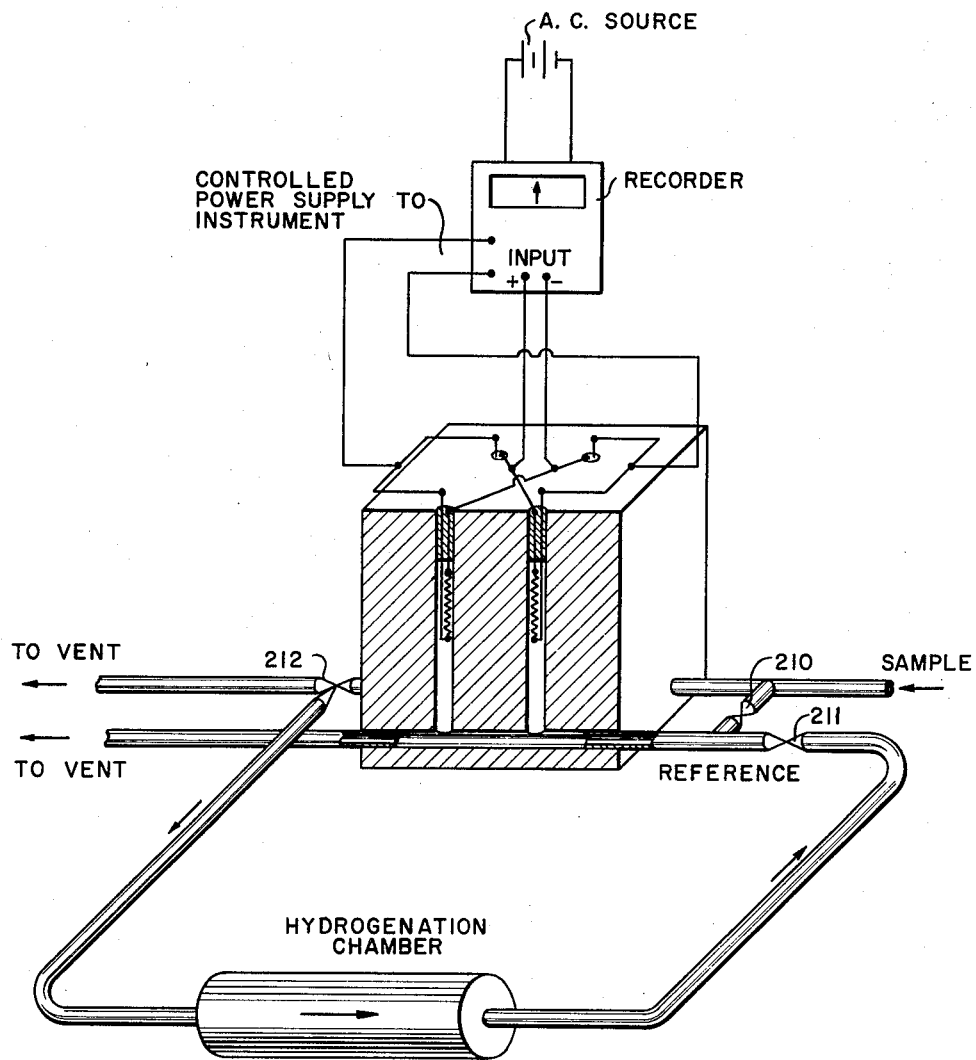
FIG. 2 is a diagram showing in more detail the thermal conductivity measuring device and hydrogenation contacting chamber associated therewith.

FIG. 2 illustrates in greater detail the appearance of a suitable thermal conductivity measuring instrument. It is patterned after the one illustrated in the above-identified Gow-Mac Bulletin. This instrument is of the type in which two reference gas cells and two sample gas cells are employed to increase the sensitivity of the bridge circuit. The cells are contained in a metal block which serves to maintain substantially constant temperature. The cells are of the diffusion type, i.e., the gas does not flow through the cells but diffuses into them. In the ordinary operation of the instrument, valve 210 is closed, valve 211 is open and valve 212 is in a position to permit gas to pass from the sample line to the hydrogenation reactor. When it is desired to establish a zero point for the instrument, valve 210 is opened, valve 211 is closed and valve 212 is set to permit gas from the sample line to pass to the vent.

The following example illustrates the improvement obtainable according to the present invention in the production of polypropylene.

Propylene was polymerized in a continuous reaction system in which fresh, purified propylene, recycled gas and catalyst were continuously added to a reactor maintained at about 50° C. and containing a liquid slurry of catalyst and polypropylene in isopentane and propylene. Part of the slurry was continuously withdrawn for recovery of polypropylene. A gas stream was continuously withdrawn and passed through a condenser which served to condense for direct return to the reactor a substantial portion of isopentane and to leave uncondensed a remaining gas which, after addition of fresh propylene, was recycled to the reactor. The catalyst contained as active ingredients titanium trichloride and aluminum diethylchloride.

The molecular weight of polypropylene is one of the important variables which must be controlled. A well known measure of molecular weight is the "intrinsic viscosity" (I.V.). For many uses, the I.V. of polypropylene must be in the range from 2 to 4, e.g., to permit its use in injection molding. High I.V. values indicate high molecular weights.

The above-described process was operated for several days without addition of hydrogen. The I.V. during the initial operation period was 5.3, after 5 days it was 10.7. I.V. values during successive 12 hour periods fluctuated by as much as 1.2.

In a subsequent run, hydrogen was continuously added to the circulating gas at a constant fixed rate which amounted to about 0.03 volume percent of the recycled gas. The recycle gas was not analyzed for hydrogen in this run. I.V. values during this run varied from 2.5 at the start of the run to as high as 3.6 during the run. The I.V. varied as much as 0.3 in successive 12 hour periods and 0.5 in successive 24 hour periods.

In another run, a sample of the recycle stream was continuously analyzed as described in connection with the drawing herein. In this run the I.V. during the initial period was 3.4, the highest I.V. obtained during the run was 3.6, the lowest was 3.3 and the I.V. at the end of the run was 3.5. The I.V. values did not vary by more than 0.1 during successive 12 hour periods except for one instance in which the variation was 0.2. In this operation a typical hydrogen content of the recycled gas was 1.1% before addition of makeup hydrogen and 1.13% after addition of makeup hydrogen.

It is seen from the above that very close control of the molecular weight of polypropylene can be obtained when operating in accordance with this invention.

It will be understood that the process of this invention is applicable in olefin polymerization processes other than those described in detail and that numerous modifications of the apparatus and method may be made within the scope of this invention.

I claim as my invention:

1. A method of producing a polyolefin of closely controlled molecular weight which comprises contacting an olefin-containing gas in liquid phase in the presence of a hydrocarbon solvent with a low pressure polymerization catalyst, maintaining in contact with said reaction mass a predetermined partial pressure of hydrogen gas in the range from 0.002 to 0.4 atm., continuously withdrawing from the reaction mass a stream containing hydrogen and recycling the gaseous portion thereof to said reaction mass, continuously sampling said gaseous portion, determining the hydrogen content thereof and controlling the rate of addition of additional hydrogen so that the total amount of hydrogen added is sufficient to maintain said partial pressure in said predetermined range whereby the molecular weight of the polyolefin product is maintained in a desired range.

2. A method of producing a polyolefin of closely controlled molecular weight which comprises contacting an olefin-containing gas in liquid phase in the presence of a hydrocarbon solvent with a low pressure polymerization catalyst, maintaining in contact with said reaction mass a predetermined partial pressure of hydrogen gas in the range from 0.002 to 0.4 atm., continuously withdrawing from the reaction mass a stream containing hydrogen and recycling the gaseous portion thereof to said reaction mass, passing a sample of said gaseous portion continuously into contact with a highly active hydrogenation catalyst whereby the hydrogen therein reacts completely with the olefin therein, obtaining a signal proportional to the difference in thermal conductivity of said sample before entry into and after discharge from said contacting step, converting said signal into an indication of hydrogen content of said sample and controlling the rate of addition of additional hydrogen so that the total amount of hydrogen added is sufficient to maintain said partial pressure in said predetermined range whereby the molecular weight of the polyolefin product is maintained in a desired range.

3. A method according to claim 2 in which said hydrogenation catalyst consists essentially of palladium supported on gamma alumina.

4. A method according to claim 2 in which said olefin is propylene.

References Cited in the file of this patent

UNITED STATES PATENTS

| | | |
|---|---|---|
| 2,766,265 | Goldsmith et al. | Oct. 9, 1956 |
| 2,817,229 | Beard | Dec. 24, 1957 |
| 2,879,663 | Thomas | Mar. 31, 1959 |
| 2,888,330 | Kapff | May 26, 1959 |
| 2,893,984 | Seelbach | July 7, 1959 |
| 2,909,510 | Thomas | Oct. 20, 1959 |
| 2,964,992 | Hurdle | Dec. 20, 1960 |

FOREIGN PATENTS

| | | |
|---|---|---|
| 217,218 | Australia | Sept. 9, 1958 |

OTHER REFERENCES

Palmer et al.: "Thermal-Conductivity Method for Analysis of Gases," Technological Papers of the Bureau of Standards, No. 249, part of vol. 18, January 7, 1924, p. 49.

Technique of Organic Chemistry, vol. II, 2nd Ed. (Catalytic Photochemical, and Electrolytic Reactions), edited by Weissberger, p. 102. Interscience Publishers Inc., New York (1956).